Figure 11:
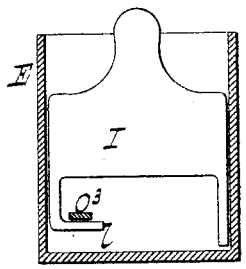
Figure 12:
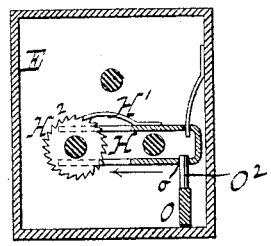
Figure 15:
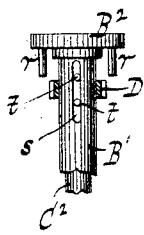

(No Model.) 4 Sheets—Sheet 1.
G. WOLFF & M. WIESER.
REGISTERING TURNSTILE.
No. 274,431. Fig. 1. Patented Mar. 20, 1883.
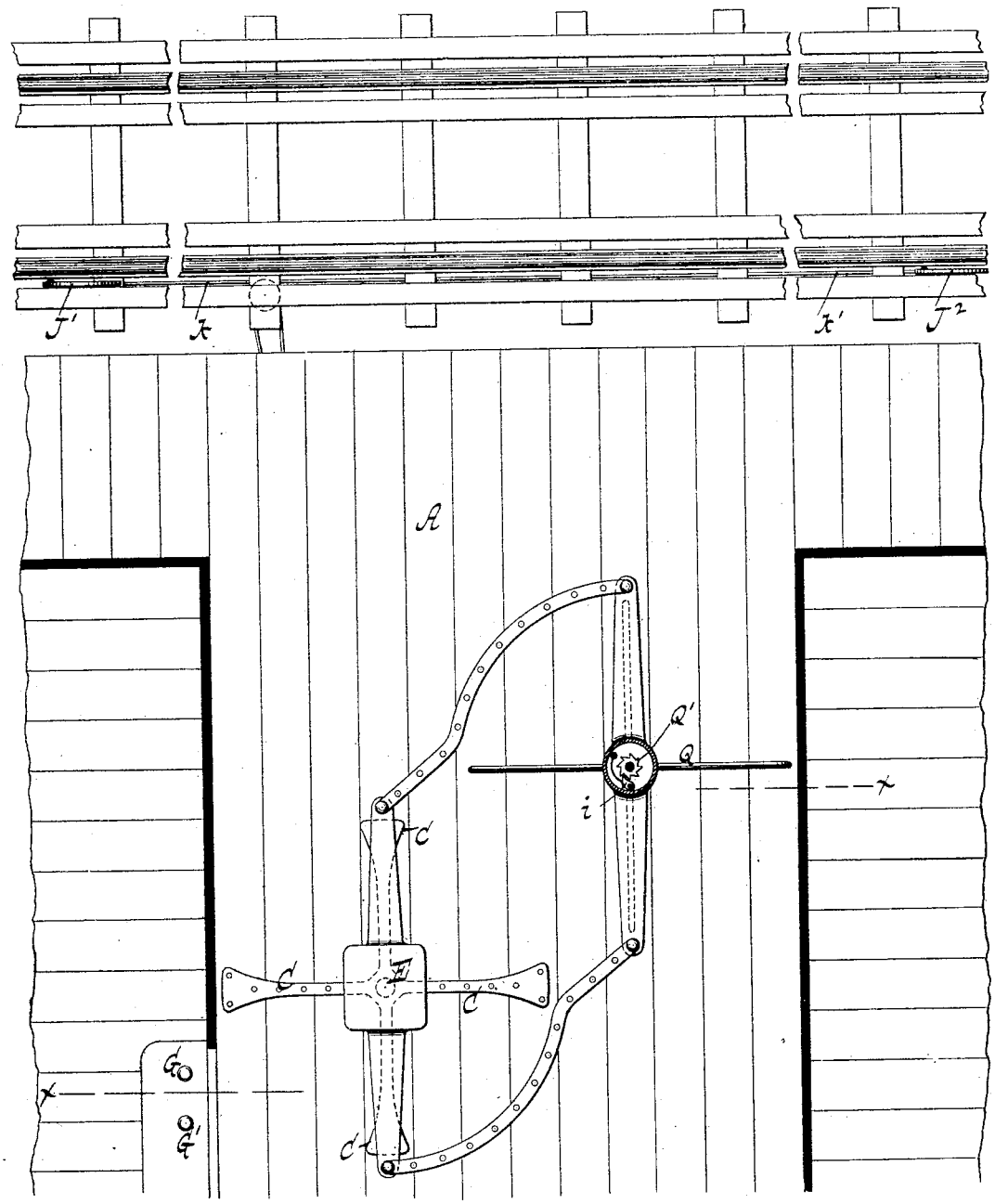
WITNESSES:
Chas. Wahlen.
William Miller.
INVENTOR
George Wolff, and
Max Wieser,
BY Van Santvoord & Hauff
ATTORNEYS (No Model.) G. WOLFF & M. WIESER. 4 Sheets—Sheet 2.
REGISTERING TURNSTILE.
No. 274,431. Patented Mar. 20, 1883.
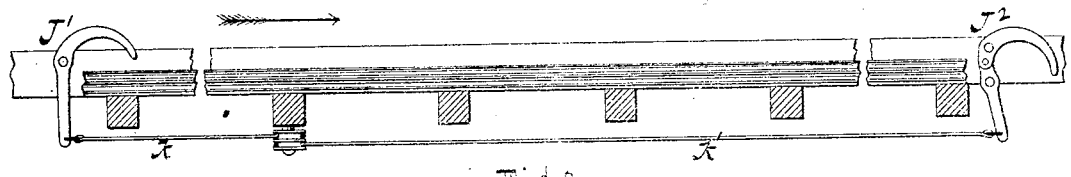
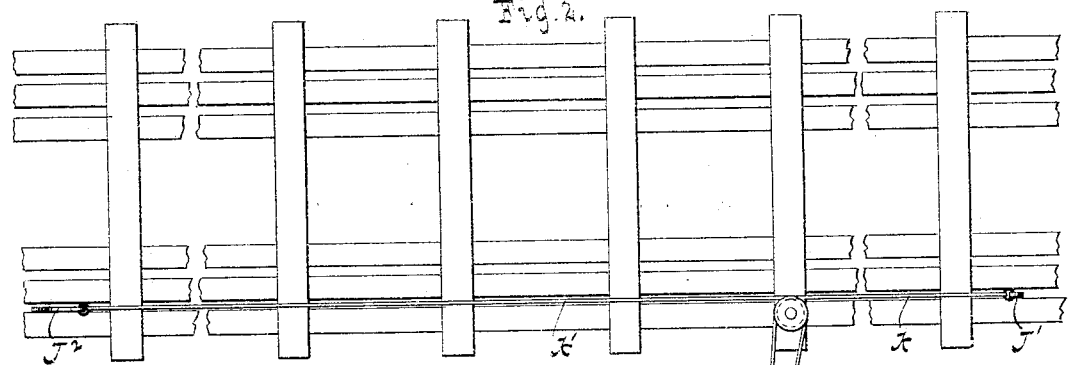
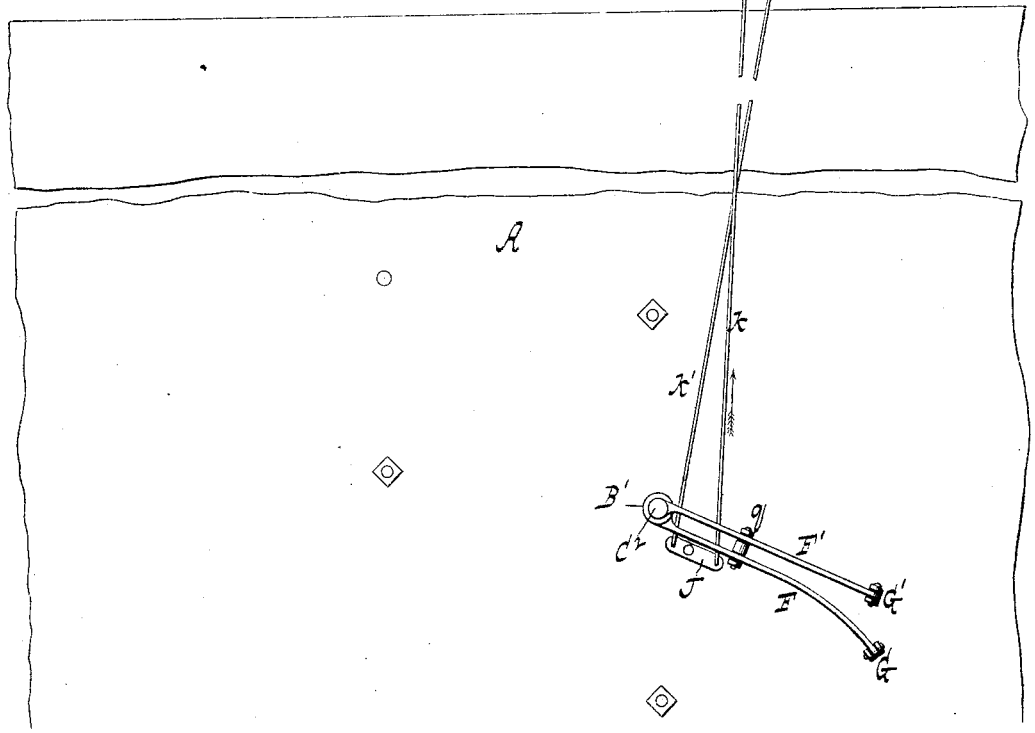
WITNESSES:
Chas. Nahlers
William Miller
INVENTOR
George Wolff, and
Max Wieser,
BY Van Santvoord & Hauff
ATTORNEYS (No Model.) 4 Sheets—Sheet 3.
G. WOLFF & M. WIESER.
REGISTERING TURNSTILE.
No. 274,431. Fig. 4. Patented Mar. 20, 1883.
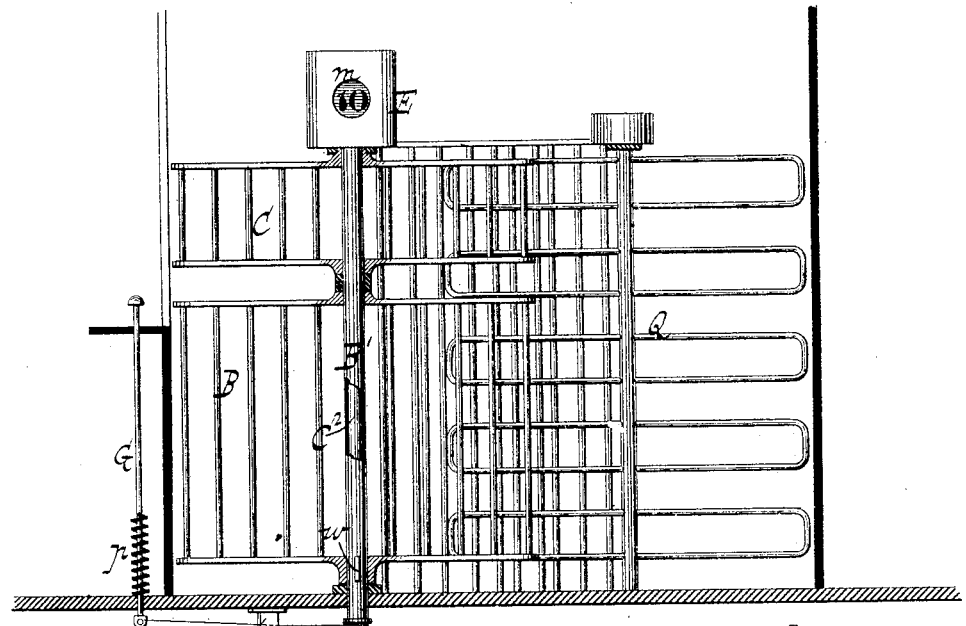
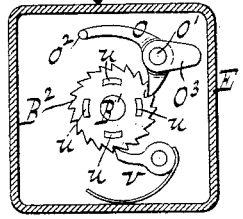
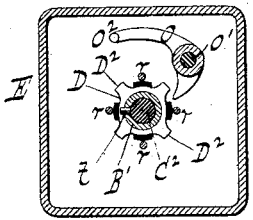
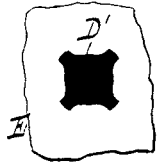
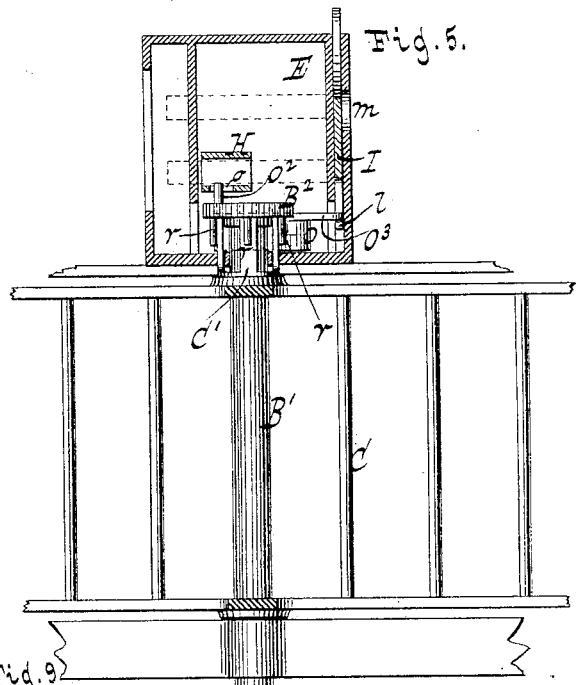
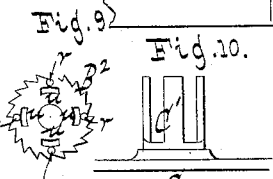
WITNESSES:
Chas. Wahlers
William Miller
INVENTOR
George Wolff, and
Max Wieser
BY Van Santvoord & Hauff
ATTORNEYS (No Model.)  G. WOLFF & M. WIESER.  4 Sheets—Sheet 4.
REGISTERING TURNSTILE.

No. 274,431.  Patented Mar. 20, 1883.

WITNESSES:
Chas. Nahlers.
William Miller

INVENTOR
George Wolff, and
Max Wieser
BY Van Santvoord & Hauff
ATTORNEYS

UNITED STATES PATENT OFFICE.

GEORGE WOLFF AND MAX WIESER, OF NEW YORK, N. Y.

REGISTERING-TURNSTILE.

SPECIFICATION forming part of Letters Patent No. 274,431, dated March 20, 1883.

Application filed November 18, 1882. (No model.)

*To all whom it may concern:*

Be it known that we, GEORGE WOLFF, a citizen of the United States, and MAX WIESER, a citizen of Germany, both residing at New York, in the county and State of New York, have invented new and useful Improvements in Registering-Turnstiles, of which the following is a specification.

This invention relates to certain improvements in turnstiles for registering purposes, the novel construction and operation of the apparatus being fully set forth in the following specification.

This invention is illustrated in the accompanying drawings, in which Figure 1 is a plan or top view, partly in section, showing the invention applied to a railway-station. Fig. 2 is an inverted plan view. Fig. 3 is a longitudinal section of the railway-track. Fig. 4 is a vertical cross-section on the line $x$ $x$, Fig. 1. The remaining figures are detail views of parts hereinafter referred to.

Similar letters indicate corresponding parts.

The letter A designates a platform—as, for example, that of a railway-station—having its place of entrance provided with two stiles, B C, both arranged to act on a registering mechanism, as hereinafter described. These stiles are situated one above the other, and the lower member, B, which, for convenience, will be called the "main stile," is higher than the upper or supplementary stile, C, while it is keyed, as at $w$, Fig. 4, to a hollow shaft, B', having fixed to its upper end a ratchet-wheel, B², (see Figs. 6, 9, and 14 to 17, inclusive,) engaging with a detent, $v$. Said ratchet-wheel B² is perforated with four (more or less) holes, $u$, concentric to each other, and the supplementary stile C is provided with a longitudinally split or divided hub, C', having its branches adapted to enter said holes, the hub extending in an upward direction from the top cross-bar of the supplementary stile, and surrounding, but having a somewhat larger diameter than, the hollow shaft B'. Said branches of the split hub C' embrace or clasp upon its edge a cam-wheel, D, which is arranged loosely on the hollow shaft B', and fitted to a socket, D', in a plate forming the bottom of the register-case E, this cam-wheel being, moreover, arranged between and in engagement with two spurs, $t$, (see Figs. 7 and 14 to 17,) which project from an axial shaft, C², combined with the hollow shaft B', and which are fitted into a vertical slot, $s$, in the hollow shaft. From the perforated ratchet-wheel B² project downward four (more or less) bits or trip-pins, $r$, which are situated exterior of the split hub C' and approximately in the circular plane of the toes or projections D² on the cam-wheel D, said spurs being equal in number to the bits. Both the hollow shaft B' and axial shaft C² are capable of vertical movement, one independently of the other, and when either shaft is moved in that direction the spurs $t$ of the axial shaft travel in the slot $s$ of the hollow shaft.

Figure 14:
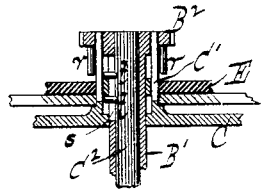

To each shaft B' C² is connected one end of an adjusting-lever, F or F', (see Figs. 2 and 4,) the other end of which is connected to a hand-rod, G or G', and which is hung to a bracket, $q$, beneath the station-platform, the hand-rods being arranged to extend up through the platform, and being provided each with a return-spring, $p$, while they are placed in such a position as to be easily accessible to the ticket agent or other attendant at the station. The springs $p$ of the rods act on the shafts B' C² through the adjusting-levers F F' with a tendency to draw the shafts downward and when the turnstiles are in normal positions the perforated ratchet-wheel B² of the hollow shaft is brought down upon and engages by means of the holes $u$ the branches of the split stile-hub C', as shown in Figs. 5, 14, and 17, while the cam-wheel D sinks into its receiving-socket D', due to the action of the spurs $t$ of the axial shaft, and in this manner both stiles are locked.

Figure 16:
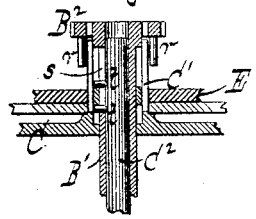
Figure 17:
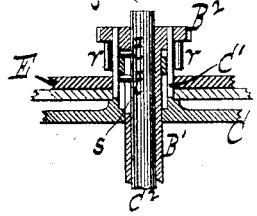

If the hollow shaft B' is raised by the appropriate hand-rod a sufficient distance to bring the ratchet-wheel B² above and out of engagement with the split hub C', as shown in Fig. 16, the lower or main stile is free to turn, due to the release of the ratchet-wheel and the hollow shaft, while if the axial shaft C² is raised far enough to bring the cam-wheel D out of its receiving-socket D', as shown in Fig. 17, the upper or supplementary stile is free to turn, due to the release of the cam-wheel, and with it the split stile-hub.

The main stile is adapted to turn independently of the supplementary stile, inasmuch as the hollow shaft B' can be entirely set free without freeing the split stile-hub C'; but the supplementary stile cannot be turned independently of the main stile, due to the fact that it is necessary to raise the hollow shaft in order to free the supplementary stile, whereby the main stile becomes released.

For the purpose of releasing both stiles, it is only necessary to raise the axial shaft $C^2$ by the appropriate hand-rod, as shown in Fig. 17, the cam-wheel being thus lifted out of its socket, and two stiles remaining connected together through the ratchet-wheel and split hub.

When both stiles are turned in unison the trip-pins $r$ of the ratchet-wheel and the toes $D^2$ of the cam-wheel both act on one arm of a register-lever, O, (see Figs. 5, 6, 7, and 12,) to impart a vibrating motion to the lever, said pins and toes alternating with each other in their said action, and the other arm of the lever being connected with the registering mechanism, the latter is actuated twice to each quarter-revolution of the stiles, whereas when the main stile is turned without the upper stile the trip-pins $r$ alone act on the register-lever, and the registering mechanism is actuated once to each quarter-revolution of the stile.

In applying the apparatus to use the main stile alone is released and allowed to turn when it is desired to register a half-fare, while both stiles are released and allowed to turn together when it is desired to register a full fare, and, owing to the division of impulses produced by the revolution of one or of both stiles, the proper registry is made.

Figure 13:
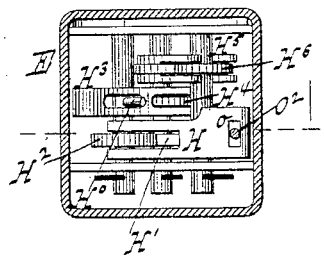

The register-lever O is mounted on a vertical pivot, O', rising from the bottom of the register-case, and it is provided on its second arm with a stud, $O^2$, which projects upward therefrom and engages a sliding spring-pawl arm, H, (see Figs. 5, 12, and 13,) by being fitted into a slot, $o$, in said arm. The pawl H' of the arm H engages a ratchet-wheel, $H^2$, whose shaft carries a tappet, $H^0$, (see Fig. 13,) adapted to engage a second pawl-arm, $H^3$, whose pawl gears into a ratchet-wheel, $H^4$, having its shaft provided with a tappet to engage a third pawl-arm, $H^5$, whose pawl meshes into a ratchet-wheel, $H^6$, so that when a vibrating motion is imparted to the register-lever O, as before stated, it acts on the first pawl-arm, H, and the latter in turn acts on the ratchet-wheel $H^2$ by means of its pawl H', to impart thereto an intermittent revolving motion. Then when the ratchet-wheel $H^2$ has made a complete revolution its shaft acts on the second pawl-arm, $H^3$, by means of the tappet $H^0$, and so on to the end of the train of gearing, whereby the desired registry is produced. This registering mechanism, however, can be modified as circumstances or the views of constructers may render expedient.

When the apparatus is used in the stations of elevated railroads or other places where the fare during certain hours is reduced one-half and half-fares are suspended, it is necessary that the amount registered in the revolution of both gates should correspond to a half-fare. To fulfill this condition the register-lever O is arranged to move vertically on its pivot, and is provided with an ear, $O^3$, (see Figs. 5, 6, and 11,) whereby it engages a vertical slide, I, the latter having a hook, $l$, to receive such ear, so that when this slide is drawn upward it carries with it the register-lever, and by moving the slide a certain distance the first arm of the lever is brought above the highest position of the cam-wheel D, so that this wheel has no action on the lever, the bits $r$ of the ratchet-wheel, however, continuing their action. On the slide I are marked two numbers, one above the other, indicating the different full fares, and the register-case E is provided with a hole or opening, $m$, through which either of said numbers may be displayed. When the slide is set to display the number highest in position (which indicates the highest fare) the register-lever O is brought to its lower or normal position, while when the slide is set to expose the number lowest in position (which indicates the reduced full fare) the register-lever is brought to its upper position.

In order to prevent the rotation of the stiles for the time a train is at the station, provision is made to automatically prevent the raising of the axial and hollow shafts as follows: Beneath the station-platform is arranged a lever, J, (see Fig. 2,) which is adapted to be brought entirely beneath the shaft-adjusting levers F F'—namely, those arms of such levers which swing in an upward direction—so that the adjusting-levers and their connections can be locked by that means. To the opposite ends of this locking-lever J are connected ropes or chains $k\ k'$, which extend over a pulley, $k^2$, and are joined to levers J' $J^2$, respectively, one such lever being single and the other double. Both these levers J' $J^2$ are arranged along the track of the railroad, one at or beyond either end of the station, in a proper position to be acted on by a passing train, and assuming that the train runs in the direction of the arrow shown in Fig. 3, it first displaces the track-lever J' and causes the latter to act on the locking-lever J through the rope $k$ in the proper manner to bring the locking-lever beneath the adjusting-levers F F', while, when after leaving the station the train reaches the track-lever $J^2$, it displaces the latter and causes it to act on the locking-lever through the rope $k'$ in the proper manner to bring the locking-lever out of its locking position, either track-lever being brought back to a normal position by the action of the other.

In the place of exit of the station-platform is arranged a stile, Q, whose shaft carries a ratchet-wheel, Q', engaging with a pawl, $i$, whereby such stile is permitted to turn only in one direction.

What we claim as new, and desire to secure by Letters Patent, is—

1. The combination, substantially as hereinbefore set forth, of the main stile, the vertically-movable hollow shaft, the perforated ratchet-wheel on the hollow shaft, having the downwardly-projecting concentric bits, the supplemental stile, the split hub of the supplemental stile, having it branches adapted to engage the holes of the perforated ratchet-wheel, the cam-wheel on the hollow shaft engaging the split stile-hub, the cam-wheel receiving-socket, the vertically-movable axial shaft, having the spurs which project through the vertical slot in the hollow shaft and carry the cam-wheel, the vibrating register-lever, and the registering mechanism.

2. The combination, substantially as set forth, of the adjusting-levers and the hand-rods, having return-springs, with the vertically-movable axial shaft, the main stile, the register-lever, the stile-locking and register-lever-actuating devices, and the registering mechanism.

3. The combination, substantially as hereinbefore set forth, of the vertical indicating-slide having the two numbers, one above the other, and the register-case having the display-opening for either of said numbers, with the vertically-movable register-lever engaging said indicating-slide, the vertically-movable hollow shaft, the vertically-movable axial shaft, the main stile, the supplemental stile, the stile-locking and register-lever-actuating devices, and the registering mechanism.

4. The combination, substantially as herein set forth, of the locking-lever J and track-levers J' J², connected to the locking-lever, with the adjusting-levers, the vertically-movable hollow shaft, the vertically-movable axial shaft, the main stile, the supplemental stile, the register-lever, the stile-locking and register-lever-actuating devices, and the registering mechanism.

In testimony whereof we have hereunto set our hands in the presence of two subscribing witnesses.

GEORGE WOLFF.
MAX WIESER.

Witnesses:
W. HAUFF,
CHAS. WAHLERS.